H. C. JONES.
Grain-Baskets.
No. 145,573. Patented Dec. 16, 1873.
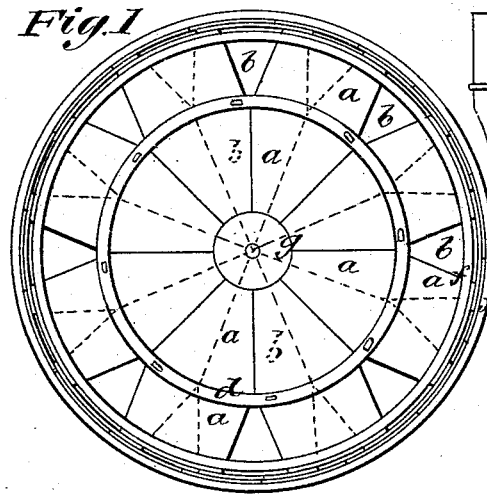
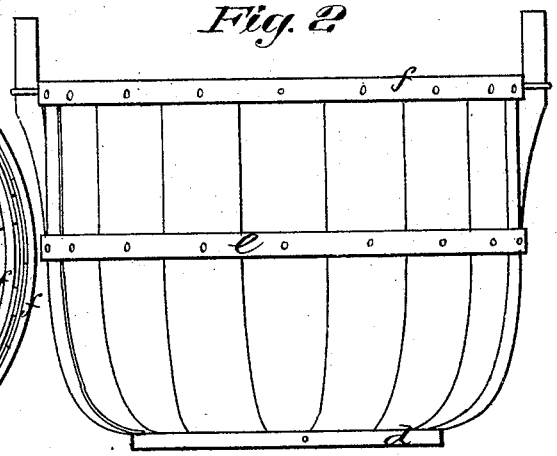
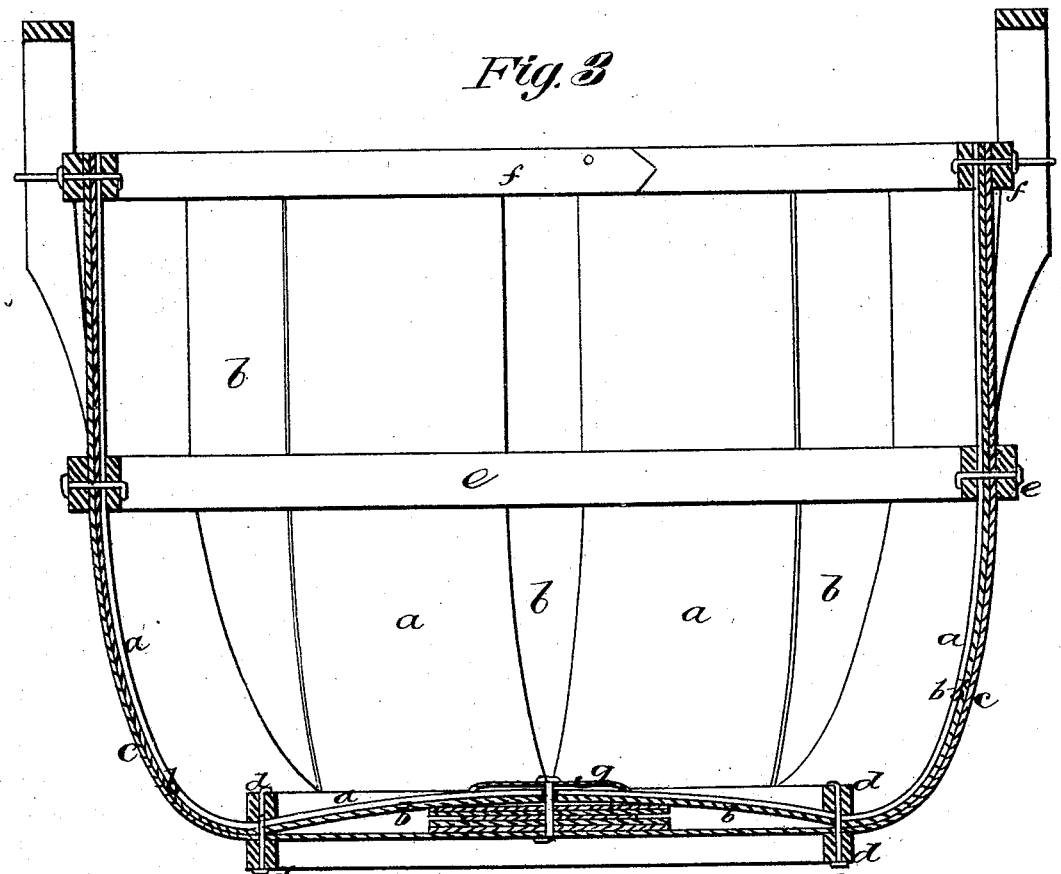

UNITED STATES PATENT OFFICE.

HORACE C. JONES, OF DOWAGIAC, MICHIGAN.

IMPROVEMENT IN GRAIN-BASKETS.

Specification forming part of Letters Patent No. 145,573, dated December 16, 1873; application filed December 16, 1872.

*To all whom it may concern:*

Be it known that I, HORACE C. JONES, of Dowagiac, in the county of Cass and State of Michigan, have invented a new and useful Improvement in Stave Baskets; and I do hereby declare that the following is a full, clear, and exact description thereof, reference being had to the accompanying drawings, making part of this specification, in which—

Figure 1 is a top view of my improved basket, that portion of the bottom of the basket which I denote as the intermediate portion being shown by dotted lines. Fig. 2 is a side elevation of the said basket. Fig. 3 is a vertical section in the line $x\ x$ of Fig. 1.

Similar letters of reference indicate corresponding parts in the several figures.

My improvement consists in a stave basket formed of two series of short staves and an outer series of long staves, the series of short staves having their lower ends tapered, and one of the series covering the joints of the other at the bottom of the basket, all as will be hereinafter described.

My improvement enables me to make the basket with a bottom which has three thicknesses of staves beyond or inside of the base-hoops, while the body of the basket may be made of two thicknesses, notwithstanding that three series of staves are used in its construction. The bottom of the basket can also be made flat and smooth, both inside and out, by the peculiar manner in which the staves are tapered and joined; and it is also strong, as the staves of one series break joints with those of another.

The following description of my invention will enable others skilled in the art to understand it:

In the drawings, $a\ a$ represent the innermost series of short staves; $b\ b$, the intermediate series of short staves; and $c\ c$, the long or outer binding series of staves. The staves $a\ a$ are so tapered at their lower termini that the sides of their tapered portions form radiuses of the circle, within which they are inclosed, when the staves are bent to form the bottom of the basket. The same construction is seen in the staves $b\ b$. The staves $c\ c$ are of the usual form, and they are long enough to run from the top hoop $d$ of the basket, on one side, down to and under the bottom hoop and up to the said top hoop on the other side of the basket. The staves $a\ a$ are set with their mitered or tapered edges close together, and, according to the angle formed by the tapered ends of these staves, so will be the width of spaces between the staves above the bottom hoop. The spaces thus left between this series of staves are covered by the intermediate or second series of staves $b$, being placed over the same in the manner represented. This series, by being thus placed, have the joints, which are formed between their tapered meeting edges, come under the middle or unbroken tapered portion of each of the staves of the series $a\ a$, as indicated by the dotted lines, Fig. 1. When the two series of staves are thus placed in respect to one another, a basket, with its body and bottom closed, is formed, but the outer series of short staves are separated and form channels just in accordance with the angle formed by their tapered ends.

I next take long staves, $c$, of a width corresponding, as nearly as practicable, to the channels existing between the staves of the series $b\ b$, and run the same under the bottom of the basket and up to the top hoop on both sides, these staves falling into the channels and giving the basket from th bottom hoop to the top hoop a smooth finish. It is not absolutely necessary that the long staves $c\ c$ just fill the channels; nor is it essential that all of the channels be filled with these long staves, but enough long staves should be used to bind the two series $a$ and $b$ together firmly. When all the staves are properly fitted together in the manner described, the ordinary bottom hoops $d\ d$, middle hoops $e$, top hoops $f$, and washer $g$, are fastened in place in the usual manner, or as shown in the drawings. Instead of a washer several pieces of staves placed upon the inner side of the tapered ends of the series $a\ a$, and extended under the inside bottom hoop $d$, may be used. Such pieces of staves would form a binding device, which would be but the equivalent of the metal washer.

I do not claim under this patent a lining of staves which are tapered at their lower extremities and confined by a rivet and washer, but as a different and improved plan of applying the principle shown in the patent granted to me December 17, 1872.

What I claim as new, and desire to secure by Letters Patent, is—

A stave basket, as herein specified, having an outer series of long staves and two series of short staves, which latter are tapered at their lower termini, the said tapered termini of one series being under the tapered termini of the other, and the spaces left between the upper portions of the innermost series being closed by the other short series, and the whole bound together, substantially as described.

HORACE C. JONES.

Witnesses:
B. W. SCHERMERHORN,
O. L. JORDAN.